US008836458B2

(12) United States Patent
Lee

(10) Patent No.: US 8,836,458 B2
(45) Date of Patent: Sep. 16, 2014

(54) METHOD FOR IMPARTING ANNULAR OPPOSITELY POLARIZED MAGNETICALLY CONDITIONED REGIONS TO A DISK SHAPED MEMBER

(71) Applicant: Methode Electronics, Inc., Carthage, IL (US)

(72) Inventor: Seong-Jae Lee, Mount Prospect, IL (US)

(73) Assignee: Methode Electronics, Inc., Chicago, IL (US)

( * ) Notice: Subject to any disclaimer, the term of this patent is extended or adjusted under 35 U.S.C. 154(b) by 0 days.

(21) Appl. No.: 13/867,644

(22) Filed: Apr. 22, 2013

(65) Prior Publication Data

US 2013/0232764 A1 Sep. 12, 2013

Related U.S. Application Data

(62) Division of application No. 13/275,693, filed on Oct. 18, 2011, now Pat. No. 8,424,393.

(51) Int. Cl.
*H01F 13/00* (2006.01)
*G01L 3/00* (2006.01)
*G01L 3/14* (2006.01)
*G01L 3/10* (2006.01)

(52) U.S. Cl.
CPC ............. *G01L 3/10* (2013.01); *G01L 3/1435* (2013.01)
USPC ............ 335/284; 73/862.331; 73/862.333; 148/100

(58) Field of Classification Search
USPC ............ 73/862.331–862.336; 148/100; 29/603.12–603.16; 335/284
See application file for complete search history.

(56) References Cited

U.S. PATENT DOCUMENTS

| 4,697,460 | A | 10/1987 | Sugiyama et al. |
| 4,896,544 | A | 1/1990 | Garshelis |
| 5,351,555 | A | 10/1994 | Garshelis |
| 5,520,059 | A | 5/1996 | Garshelis |
| 6,047,605 | A | 4/2000 | Garshelis |
| 6,220,105 | B1 | 4/2001 | Cripe |
| 6,513,395 | B1 | 2/2003 | Jones |
| 6,581,480 | B1 * | 6/2003 | May et al. ............... 73/862.333 |
| 6,871,555 | B2 | 3/2005 | May |
| 6,910,391 | B1 | 6/2005 | May |
| 6,959,612 | B2 | 11/2005 | May |
| 7,219,564 | B1 | 5/2007 | May |
| 7,302,867 | B2 | 12/2007 | May |
| 8,013,701 | B2 * | 9/2011 | Ohashi ..................... 335/306 |
| 8,087,304 | B2 | 1/2012 | Lee |
| 2009/0107257 | A1 | 4/2009 | May |

OTHER PUBLICATIONS

Lupu, N. "Magnetostriction vs. Magnetoelastic Effects" European School on Magnetism. Sep. 9-18, 2007. <http://magnetism.eu/esm/2007-cluj/questions/magnetostriction.pdf>.*

* cited by examiner

*Primary Examiner* — Lisa Caputo
*Assistant Examiner* — Jonathan Dunlap
(74) *Attorney, Agent, or Firm* — Blank Rome LLP

(57) ABSTRACT

A magnetic torque sensing device having a disk-shaped member with a magnetoelastically active region. The magnetoelastically active region has oppositely polarized magnetically conditioned regions with initial directions of magnetization that are perpendicular to the sensitive directions of magnetic field sensor pairs placed proximate to the magnetically active region. Magnetic field sensors are specially positioned in relation to the disk-shaped member to accurately measure torque while providing improved RSU performance and reducing the detrimental effects of compassing.

6 Claims, 7 Drawing Sheets

METHOD FOR IMPARTING ANNULAR OPPOSITELY POLARIZED MAGNETICALLY CONDITIONED REGIONS TO A DISK SHAPED MEMBER

CROSS REFERENCE TO RELATED APPLICATIONS

This patent application is a divisional of U.S. Pat. No. 8,424,393, filed Oct. 18, 2011, the entire disclosure of which is incorporated by reference herein.

BACKGROUND OF THE INVENTION

1. Field of Invention

The present invention relates to methods and sensing devices for automotive transmissions and, more particularly, to non-contacting magnetoelastic torque sensors for providing a measure of the torque transmitted radially in a transmission converter drive plate or similar disk-shaped member.

2. Description of the Related Art

In the control of systems having rotating drive shafts, torque and speed are fundamental parameters of interest. Therefore, the sensing and measurement of torque in an accurate, reliable, and inexpensive manner has long been a primary objective of such control system designs.

Previously, torque measurement was accomplished using contact-type sensors directly attached to a shaft. One such sensor is a "strain gauge" type torque detection apparatus, in which one or more strain gauges are directly attached to the outer peripheral surface of the shaft and a change in resistance caused by torque-induced strain is measured by a bridge circuit or other well known means. However, contact-type sensors are relatively unstable and of limited reliability due to the direct contact with the rotating shaft. In addition, they are expensive and are thus commercially impractical for competitive use in many applications, such as automotive steering systems, for which torque sensors are sought.

Subsequently, non-contact torque sensors of the magnetostrictive type were developed for use with rotating shafts. For example, U.S. Pat. No. 4,896,544 to Garshelis, which is incorporated herein by reference, discloses a sensor comprising a torque-carrying member, with an appropriately ferromagnetic and magnetostrictive surface, two axially distinct circumferential bands within the member that are endowed with respectively symmetrical, helically-directed residual stress-induced magnetic anisotropy, and a magnetic discriminator device for detecting, without contacting the torqued member, differences in the response of the two bands to forces applied to the torque-carrying member. Most typically, magnetization and sensing are accomplished by providing a pair of excitation or magnetizing coils overlying and surrounding the bands, with the coils connected in series and driven by alternating current. Torque is sensed using a pair of oppositely connected sensing coils for measuring a difference signal resulting from the external magnetic fluxes of the two bands. Unfortunately, providing sufficient space for the requisite excitation and sensing coils on and around the device on which the sensor is used can create practical problems in applications where space is at a premium. Also, such sensors may be impractically expensive for use on highly cost-competitive devices, such as in automotive applications.

Torque transducers based on measuring the field arising from the torque induced tilting of initially circumferential remanent magnetizations have been developed which, preferably, utilize a thin wall ring ("collar") serving as the field generating element. See, for example, U.S. Pat. Nos. 5,351, 555 and 5,520,059 to Garshelis, which are incorporated herein by reference. Tensile "hoop" stress in the ring, associated with the means of its attachment to the shaft carrying the torque being measured establishes a dominant, circumferentially directed, uniaxial anisotropy. Upon the application of torsional stress to the shaft, the magnetization reorients and becomes increasingly helical as torsional stress increases. The helical magnetization resulting from torsion has both a radial component and an axial component, the magnitude of the axial component depending entirely on the degree of torsion. One or more magnetic field vector sensors may be used to sense the magnitude and polarity of the field arising, as a result of the applied torque, in the space above the magnetically conditioned regions on a shaft, and provide a signal output reflecting the magnitude and direction of the torque. Inasmuch as the peak allowable torque in a ring sensor is limited by slippage at the ring/shaft interface, concerns have been expressed regarding distortion arising from slippage at the ring/shaft interface under conditions of torque overload. This, together with the need for multiple parts of different materials to minimize the adverse effects of parasitic fields, has encouraged the investigation of alternative constructions.

Magnetoelastic torque transducers have been developed in which the active, torque sensing region is formed directly on the shaft itself, rather than on a separate ferromagnetic element which then has to be affixed to the shaft. See, for example, U.S. Pat. No. 6,047,605 to Garshelis, which is incorporated herein by reference. In one form of these so-called "collarless" transducers, the magnetoelastically active region is polarized in a single circumferential direction and itself possesses sufficient magnetic anisotropy to return the magnetization in the region, following the application of torque to the member, to the single circumferential direction when the applied torque is reduced to zero. The torqued shaft is desirably formed of a polycrystalline material wherein at least 50% of the distribution of local magnetizations lie within a 90-degree quadrant symmetrically disposed around the direction of magnetic polarization and have a coercivity sufficiently high that the transducing region field does not create parasitic magnetic fields in proximate regions of the shaft of sufficient strength to destroy the usefulness, for torque sensing purposes, of the net magnetic field seen by the magnetic field sensor. In particularly preferred forms of such transducers the shaft is formed of a randomly oriented, polycrystalline material having cubic symmetry and the coercivity is greater than 15 Oersted (Oe), desirably greater than 20 Oe and, preferably, greater than 35 Oe.

More recently, non-contacting magnetoelastic torque sensors have been developed that provide signals indicative of the torque transmitted between radially separated locations of disk-shaped members. U.S. Pat. No. 6,513,395 to Jones, which is incorporated herein by reference, describes a torque sensor that includes a disk-shaped member having a magnetoelastically active region that is polarized in a single circumferential direction. In that patent, a magnetic field sensor is mounted proximate to the active region, the sensor sensing the magnitude of a magnetic field resulting from a torque transferred from a shaft to the disk-shaped member, and the sensor outputting a signal in response thereto. Such a configuration may be susceptible to compassing as discussed below. That patent also describes a disk having dual circumferentially and oppositely polarized regions, with two sensors positioned along the same radial line, their sensitive directions oriented radially and oppositely to permit common mode field cancellation. This placement of sensors, however, has the undesired result in which the sensors pick up magnetic field signals that do not change linearly in response to a change in torque applied to the disk.

Other prior art describes a torque sensor that includes a disk-shaped member having a region in which annular magnetically conditioned regions are separated from one another and spaced in a radial direction. It is believed, however, that a torque sensor having a gap between magnetically conditioned regions may exhibit a large rotational signal uniformity (RSU) signal due to random magnetic leakage fields between the two annular magnetically conditioned regions. Ideally, a torque sensor will exhibit a zero RSU signal, which is defined as no variation in signal output during the rotation of a member when no torque, or a constant torque, is applied to the rotating member. In actual practice however, due to deficiencies in the surface preparation and magnetization processes, noticeable RSU signals are detected. Furthermore, a torque sensor having a disk-shaped member with a gap between magnetically conditioned regions requires additional space, which is not desirable in applications in which the disk has a limited amount of flat surface available for magnetically conditioned regions.

Because magnetic fields, in the context of their measurement, are fungible, the sensors taught by the above and other prior art may be susceptible to other magnetic fields of exterior origin. In particular, the earth's magnetic field will cause a phenomenon known as "compassing," in which the measured field is the sum of the torque induced magnetic field and the earth's magnetic field. Within the context of this disclosure, the term "compassing" shall be used to describe any error resulting from the earth's magnetic field.

Magnetic fields of external origin can emanate from both far field and near field sources. A far field source, such as the earth with its magnetic field, generally has the same effect on each magnetic field sensor in a torque sensing device having multiple magnetic field sensors. Near field sources, such as permanent magnets, magnetized wrenches, motors, solenoids, etc., may create magnetic fields having significant local gradients, thus having significantly different effects on the different magnetic field sensors in a torque sensing device having multiple magnetic field sensors.

U.S. Pat. No. 5,520,059 to Garshelis addresses the compassing issue with respect to far field sources. In that patent, a shaft is described having two axially distinct magnetoelastically active regions, polarized in opposite circumferential directions, with magnetic field sensors having opposite axial polarities positioned proximate to the active regions and providing output signals in response to a torque applied to the shaft. By summing the outputs of the magnetic field sensors, all common mode external magnetic fields, i.e. far fields, are canceled. In applications employing such a scheme, the oppositely polarized sensors should be placed as close to each other as possible to preserve the efficiency of the common mode rejection scheme. Sensors that are spaced from one another exhibit reduced common mode rejection efficiency, as the earth's magnetic field may be significantly distorted around ferromagnetic parts in and around the torque sensor.

U.S. Pat. App. Pub. No. 2009/0230953 to Lee, which is incorporated herein by reference, describes a torque sensing device designed to cancel near field magnetic noise from external sources without canceling a torque-induced magnetic field. That reference describes a torque sensor including three sets of magnetic field sensors, axially spaced proximate to a shaft, the shaft having a magnetoelastically active region that is polarized in a circumferential direction. Signals received by each of the magnetic field sensors are adjusted to compensate for the effects of near field sources.

In torque sensing devices having ferromagnetic members with annular magnetoelastically active regions, it is desirable for a magnetic field sensor placed proximate to the magnetoelastically active region to pick up a signal that accurately represents the torque applied to the member, regardless of the angular distance between the magnetic field sensor and a radius of the member. Torque sensing devices that demonstrate this characteristic are said to demonstrate improved rotational signal uniformity (RSU). Non-uniformities in the depth, width, or magnetic field strength, about an annular magnetoelastically active region may lead to noticeable RSU signals and, hence, inaccurate torque measurements. Improved RSU performance, and a decreased hysteresis effect, may also be achieved by subjecting the ferromagnetic member to an appropriate surface hardness process, as is known in the art, prior to magnetization. Lee, for example describes a torque sensing device designed to exhibit improved RSU performance by incorporating a plurality of angularly and axially spaced magnetic field sensors placed proximate to a circumferential surface of a rotatable shaft.

The torque sensing devices described in the prior art are not specially configured for measuring the torque transmitted between a shaft and a radially separated portion of a disk-shaped member, while demonstrating improved RSU performance and reducing detrimental effects caused by compassing. Accordingly, there exists a need for such a device.

SUMMARY OF THE INVENTION

The present invention, as described herein, is generally applicable to the measurement of torque in any disk-shaped member that is rotatable about an axis, such as a pulley, gear, sprocket, or the like.

It is a principal object of the present invention to provide a torque sensing device having non-contacting magnetic field sensors positioned proximate to a disk-shaped member, for measuring the torque transmitted between a shaft and a radially separated portion of the disk-shaped member.

It is another object of the invention to provide a torque sensing device having magnetic field sensors that output a signal representative of an applied torque, wherein the output signal varies linearly with respect to variations in the applied torque.

It is another object of the present invention to provide a torque sensing device having magnetic field sensors placed in pairs, the magnetic field sensors having their sensing directions opposite one another, to minimize the detrimental effects of magnetic noise, including compassing.

It is another object of the present invention to provide a torque sensing device with an annular magnetoelastically active region, having dual, non-separated, oppositely polarized magnetically conditioned regions to enhance the RSU performance of the torque sensing device.

It is another object of the present invention to provide a torque sensing device with multiple, angularly-spaced magnetic field sensors that are specially positioned to enhance the RSU performance of the torque sensing device.

Briefly described, those and other objects, advantages, and features of the present invention are accomplished, as embodied and fully described herein, by a magnetic torque sensing device, which includes a generally disk-shaped member having opposite generally circular surfaces and a central axis of rotation; first and second magnetically conditioned regions disposed on the disk-shaped member to form a magnetoelastically active region, which is both ferromagnetic and magnetorestrictive, wherein the magnetoelastically active region produces a magnetic field that varies with a torque applied to the disk-shaped member, and wherein the magnetically active region possesses sufficient magnetic anisotropy to return the magnetization in the magnetoelastically active region to an initial state when the torque applied to the disk-shaped member is reduced to zero; and at least one pair of magnetic field sensors disposed adjacent to one another and proximate to the magnetoelastically active region, wherein sensitive directions of the magnetic field sensors in each pair are opposite one another and perpendicular to the direction of polarization of the first and second magnetically conditioned regions, wherein the magnetic field sensors provide an output signal that is representative of the torque applied to the disk-shaped member, and wherein variation in the output signal is substantially linear with respect to variation in the torque applied to the disk-shaped member.

The magnetically conditioned regions of the device may be annularly shaped with no gap therebetween to increase the accuracy of the torque sensing device. The device may include multiple pairs of magnetic field sensors to increase accuracy. The magnetic field sensors may be circumferentially oriented when magnetically conditioned regions are axially polarized, and axially oriented when magnetically conditioned regions are circumferentially polarized to enhance the linear performance of the device and to increase accuracy.

With those and other objects, advantages, and features of the invention that may become hereinafter apparent, the nature of the invention may be more clearly understood by reference to the following detailed description of the invention, the appended claims and to the several drawings attached herein.

DETAILED DESCRIPTION OF THE PREFERRED EMBODIMENTS

Figure 1:
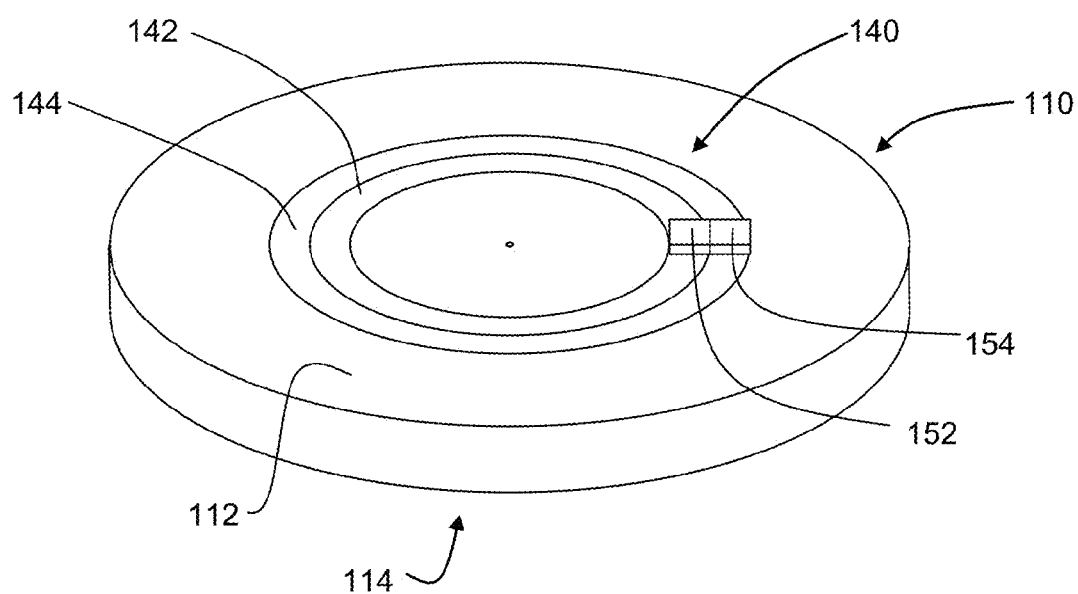
FIG. 1 is a perspective view of a disk-shaped member according to the present invention.

Several preferred embodiments of the invention are described for illustrative purposes, it being understood that the invention may be embodied in other forms not specifically shown in the drawings. The figures herein are provided for exemplary purposes and are not drawn to scale.

Turning first to FIG. 1, shown therein is a perspective drawing of a generally disk-shaped member 110 in accordance with the torque sensing device of the present invention. The disk 110 is formed of ferromagnetic material and is, or at least includes, a magnetoelastically active region 140. The material selected for forming the disk 110 must be at least ferromagnetic to ensure the existence of magnetic domains for at least forming a remanent magnetization in the magnetoelastically active region 140, and must be magnetostrictive such that the orientation of magnetic field lines in the magnetoelastically active region 140 may be altered by the stresses associated with applied torque. The disk 110 may be completely solid, or may be partially hollow. The disk 110 may be formed of a homogeneous material or may be formed of a mixture of materials. The disk 110 may be of any thickness, and is preferably between about 3 mm and about 1 cm thick.

The magnetoelastically active region 140 is preferably flat, and comprises at least two radially distinct, annular, oppositely polarized magnetically conditioned regions 142, 144, defining the magnetoelastically active region 140 of the torque sensing device. The top and bottom surfaces 112, 114 do not have to be flat, however, as shown, but could have variable thickness in cross-section from the center of the disk 110 to the outer edge. Depending on the application for which the torque sensing device is desired, it may be impractical to position magnetic field sensors 152, 154 on both sides of the disk 110. Therefore, the present invention is designed to function in instances where the magnetoelastically active region 140 is present on only one surface of the disk 110. However, the magnetoelastically active region 140 may be present on both sides of the disk 110.

Figure 2:
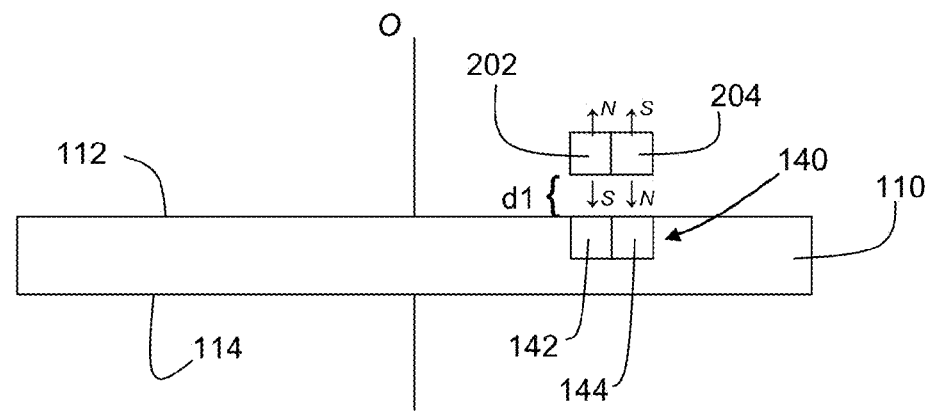
FIG. 2 is a side elevation view of the disk-shaped member of FIG. 1, depicting the magnetization of a magnetoelastic active region, according to an embodiment of the present invention.

FIG. 2 shows a side view of the disk 110, and illustrates a process by which the magnetoelastically active region 140 may be formed on an annular portion of the disk 110. As shown, two permanent magnets 202, 204, having opposite directions of magnetization (and thus opposite polarity), are positioned proximate to the surface of the disk 110 at a distance d1. Following the positioning of the permanent magnets 202, 204, the disk 110 may be rotated about its central axis O, resulting in the formation of two annular, oppositely polarized, magnetically conditioned regions 142, 144. Alternatively, the magnetically conditioned regions 142, 144 may be formed by rotating the permanent magnets about the central axis O, while the disk 110 remains stationary. During creation of the magnetoelastically active region 140, the speed of rotation about the central axis O, and the distance d1 between the permanent magnets 202, 204 and the surface of the disk 110, should be kept constant to ensure uniformity of the magnetoelastically active region 140 and improve the RSU performance of the torque sensing device. Preferably, during the creation of the magnetoelastically active region 140, the permanent magnets 202, 204 are positioned adjacent to one another, with no gap therebetween, to form magnetically conditioned regions 142, 144 with no gap therebetween. The absence of a gap between the magnetically conditioned regions 142, 144 is understood to result in a torque sensing device with improved RSU performance.

In forming the magnetoelastically active region 140, the strength of the permanent magnets 202, 204, and the distance d1 between the permanent magnets 202, 204 and the disk 110, must be carefully selected to optimize performance of the torque sensing device. By using stronger permanent magnets 202, 204, and by positioning permanent magnets 202, 204 closer to the disk 110, one can generally produce a magnetoelastically active region 140 that will provide a stronger, more easily measurable signal, when employed by a torque sensing device. However, by using permanent magnets 202, 204 that are excessively strong, or by placing permanent magnets 202, 204 excessively close to the disk 110, one can produce a magnetoelastically active region 140 that exhibits hysteresis, which negatively affects the linearity of the signal produced by the torque sensing device in response to an applied torque. Preferably, the magnetoelastically conditioned region 140 is created using rectangular N42 or N45 grade neodymium iron boron (NdFeB) magnets placed at a distance of between about 0.1 mm and 5 mm from the surface of the disk 110. More preferably, magnets are placed at a distance of about 3 mm from the surface of the disk 110. Preferably, the width of the magnetoelastically active region 140 is not greater than 13 mm. More preferably, the width of the magnetoelastically active region 140 is about 10 mm.

FIG. 2 shows an embodiment having permanent magnets 202, 204 with directions of magnetization that are perpendicular to the plane of the disk 110. This configuration results in magnetically conditioned regions 142, 144 that are initially polarized in the axial direction (i.e., perpendicular to the disk surface). In this configuration, the magnetically conditioned regions 142, 144 are preferably polarized such that, in the absence of torque applied to the disk 110 (i.e., when the torque sensing device is in the quiescent state), the magnetically conditioned regions 142, 144 have no net magnetization components in the circumferential or radial directions.

During formation of the magnetoelastically active region 140, the permanent magnets 202, 204 may be positioned, as shown in FIG. 2, such that the innermost magnetically conditioned region 142 is created with its magnetic north pole directed upward, and the outermost magnetically conditioned region 144 is created with its magnetic north pole directed downward. Alternatively, during formation of the magnetoelastically active region 140, the permanent magnets may be positioned such that the innermost magnetically conditioned region 142 is created with its magnetic north pole directed downward, and the outermost magnetically conditioned region 144 is created with its magnetic north pole directed upward.

Figure 3:
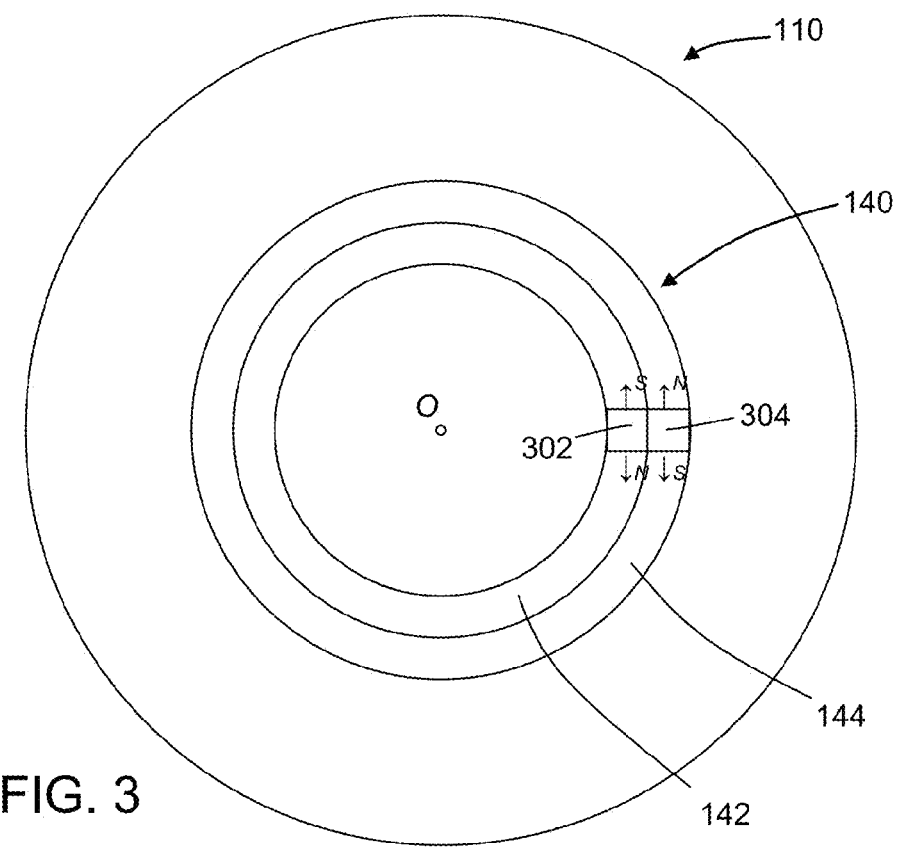
FIG. 3 is a top plan view of the disk-shaped member of FIG. 2, depicting the magnetization of a magnetoelastic active region, according to an embodiment of the present invention.

FIG. 3 shows a top view of the disk 110, and illustrates an embodiment in which the magnetoelastically active region 140 is created with permanent magnets 302, 304 having directions of magnetization that are parallel to the plane of the disk 110, in the circumferential direction. This configuration results in magnetically conditioned regions 142, 144 that are initially polarized in the circumferential direction of the disk 110. In this configuration, the magnetically conditioned regions 142, 144 are preferably polarized such that, in the absence of torque applied to the disk 110, the magnetically conditioned regions 142, 144 have no net magnetization components in the axial or radial directions.

During formation of the magnetoelastically active region 140, the permanent magnets 302, 304 may be positioned, as shown in FIG. 3, such that the innermost magnetically conditioned region 142 is created with its magnetic north pole having a clockwise orientation, and the outermost magnetically conditioned region 144 is created with its magnetic north pole having a counter-clockwise orientation. Alternatively, during formation of the magnetoelastically active region, the permanent magnets 302, 304 may be positioned such that the innermost magnetically conditioned region 142 is created with its magnetic north pole having a counter-clockwise orientation, and the outermost magnetically conditioned region 144 is created with its magnetic north pole having a clockwise orientation.

Figure 4A:
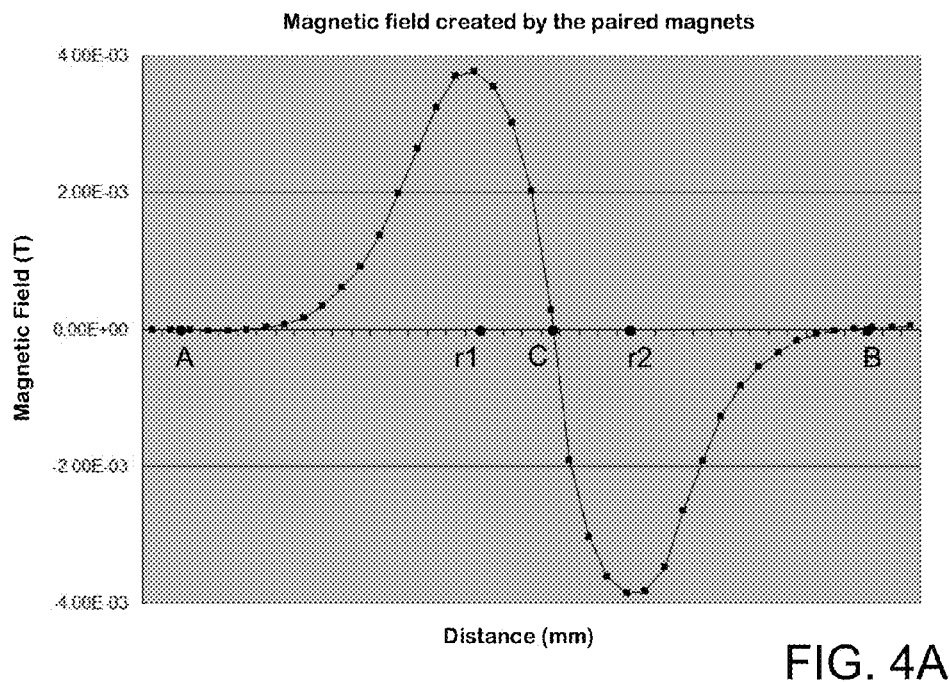
FIG. 4A is a graph illustrating the strengths of the magnetic fields in the magnetically conditioned regions when the torque sensing device of the present invention is in a quiescent state.
Figure 4B:
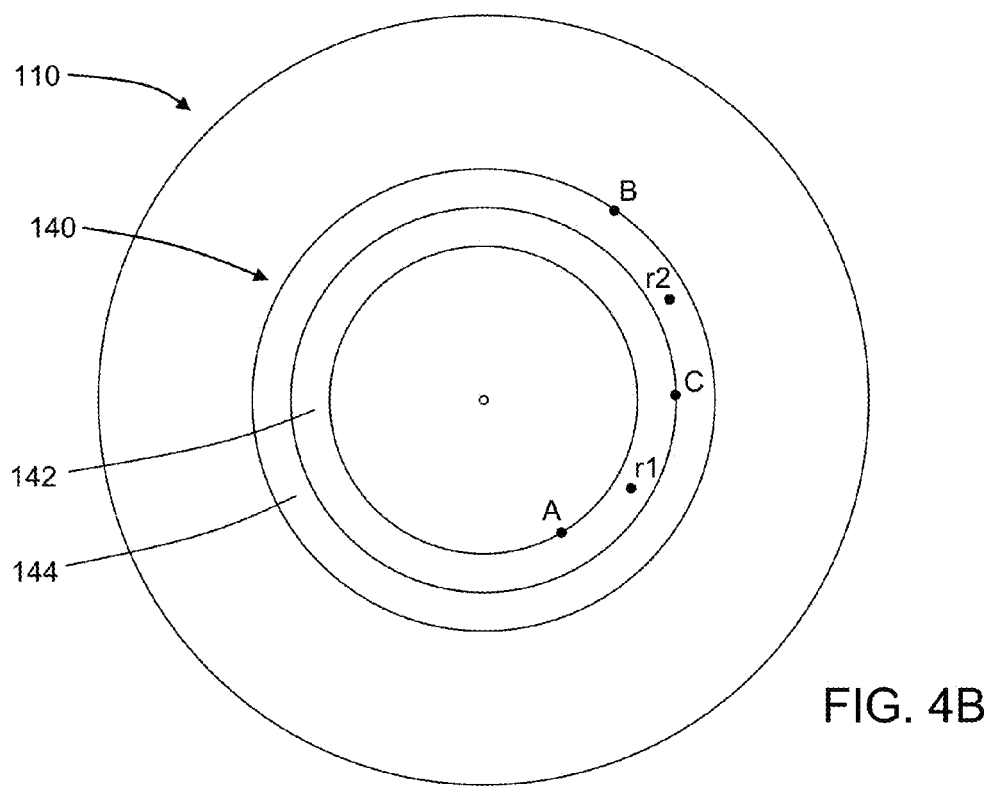
FIG. 4B is a top plan view of a disk-shaped member according to the present invention, illustrating the relationship between the disk-shaped member and the graph of FIG. 4A.

Turning to FIGS. 4A and 4B, FIG. 4A is a graph illustrating the strength of the magnetic fields in the magnetically conditioned regions 142, 144 when the torque sensing device is in the quiescent state. Values along the vertical axis represent the magnetic field strength of the magnetoelastically active region 140. The magnetic fields emanating from the surface of the disk 110 may have their principle components in the axial direction, as with the disk 110 of FIG. 2, or in the circumferential direction, as with the disk 110 of FIG. 3. Values along the horizontal axis represent distance along a radius of the disk 110 from the center line O to the outer edge of the disk 110. Point A corresponds to a point along the edge of the innermost magnetically conditioned region 142 nearest the center of the disk 110. Point B corresponds to a point along the edge of the outermost magnetically conditioned region 144 nearest the circumferential edge of the disk 110. Point C corresponds to a point along the boundary between the innermost and outermost magnetically conditioned regions 142, 144. Point r1 corresponds to a point within the innermost magnetically conditioned region 142, at which the magnetic field strength is at a maximum. Point r2 corresponds to a point within the outermost magnetically conditioned region 144, at which the magnetic field strength is at a maximum. FIG. 4B shows the disk 110 with points A, B, C, r1, and r2 corresponding to those points shown in the graph of FIG. 4A. Points r1 and r2, corresponding to the peak magnetic fields, indicate the distances from the center of the disk 110 at which magnetic field sensors 152, 154 should be placed to optimize the direction of the external magnetic flux, and hence maximize the performance of the torque sensing device. The units provided in FIG. 4 are for exemplary purposes and are not limiting on the present invention.

Figure 5:
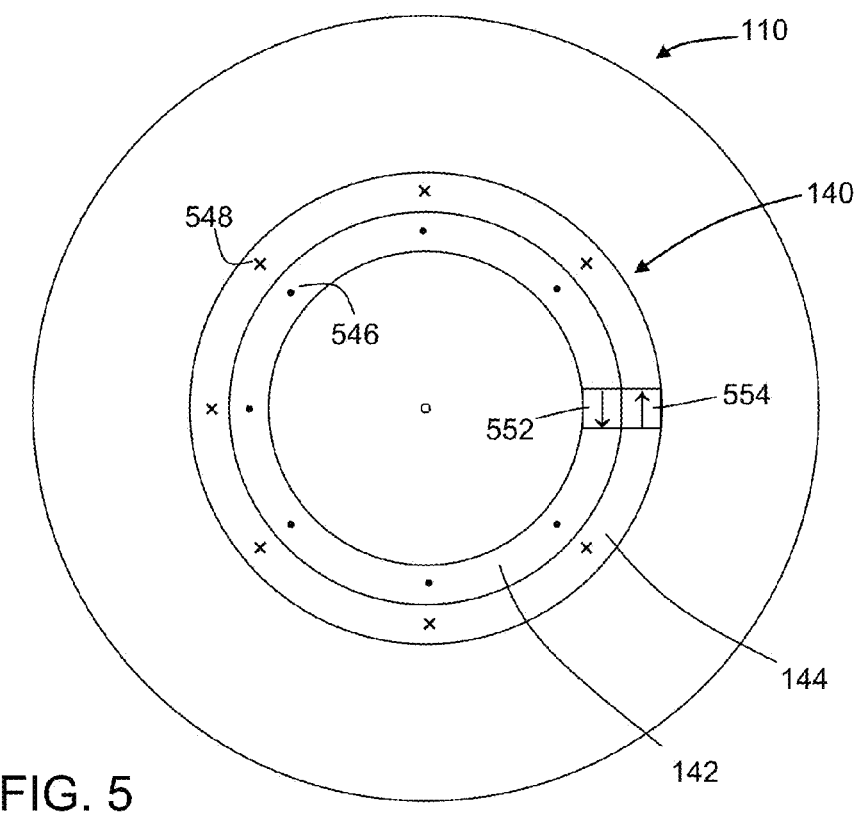
FIG. 5 is a top plan view of a disk-shaped member, showing illustrative positionings of magnetic field sensors, according to another embodiment of the present invention.

Turning to FIG. 5, shown therein is a top plan view of the disk 110 in the quiescent state, with a magnetoelastically active region 140 created by permanent magnets 202, 204 as shown in FIG. 2. The magnetoelastically active region 140 includes dual magnetically conditioned regions 142, 144 that are oppositely polarized in positive and negative axial directions, respectively. The dots in FIG. 5 indicate magnetic field lines 546 oriented perpendicular to the surface of the disk 110, such that the magnetic field lines 546 are directed out of the page. The X's in FIG. 5 indicate magnetic field lines 548 oriented perpendicular to the surface of the disk 110, such that the magnetic field lines 548 are directed into the page.

A pair of magnetic field sensors 552, 554 is positioned proximate to the magnetoelastically active region 140, such that each magnetic field sensor 552, 554 is placed over the portion of the magnetically conditioned region 142, 144 at a location where the magnetic field strength is at a maximum. The magnetic field sensors 552, 554 are oriented such that their sensitive directions are perpendicular to the direction of magnetization in the magnetoelastically active region 140. In FIG. 5, arrows indicate the sensitive directions of the magnetic field sensors 552, 554. Magnetic field sensors 552, 554 are oriented with their sensitive directions parallel to the surface of the disk 110 (i.e., in the circumferential direction), and the magnetically conditioned regions 142, 144 are polarized perpendicular to the surface of the disk 110 (i.e., in the axial direction). This configuration ensures that the representative signals outputted by the magnetic field sensors 552, 554 vary linearly with respect to variations in the torque applied to the disk 110.

Magnetic field sensors 552, 554 are oppositely polarized and provided in pairs. This placement technique may be referred to as a common mode rejection configuration. Output signals from each of the magnetic field sensors 552, 554 in the pair may be summed to provide a signal representative of the torque applied to the disk 110. External magnetic fields have equal effects on each of the magnetic field sensors 552, 554 in the pair. Because the magnetic field sensors 552, 554 in the pair are oppositely polarized, the summed output of the magnetic field sensors 552, 554 is zero with respect to external magnetic fields. However, because the magnetically conditioned regions 142, 144 are oppositely polarized, as are the magnetic field sensors 552, 554, the summed output of the magnetic field sensors 552, 554 is double that of each individual magnetic field sensor 552, 554 with respect to the torque applied to the disk 110. Therefore, placing magnetic field sensors 552, 554 in a common mode rejection configuration greatly reduces the detrimental effects of compassing in the torque sensing device.

Figure 6:
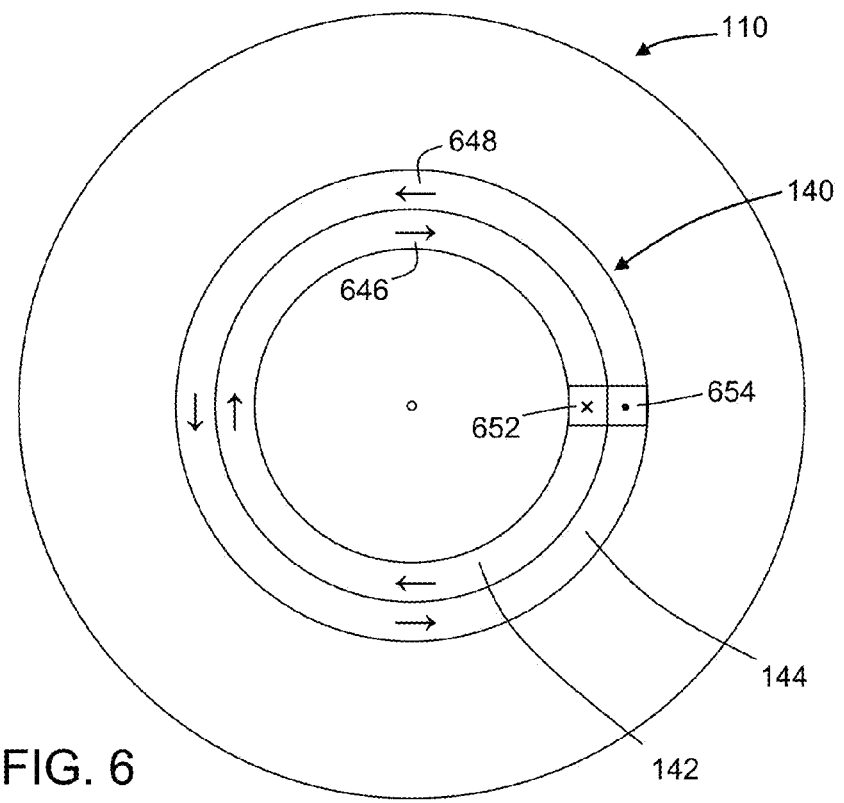
FIG. 6 is a top plan view of a disk-shaped member, showing illustrative positionings of magnetic field sensors, according to another embodiment of the present invention.

Turning to the embodiment shown in FIG. 6, the disk 110 is shown in the quiescent state, and has a magnetoelastically active region 140 created by permanent magnets 302, 304 as shown in FIG. 3. The magnetoelastically active region 140 includes dual magnetically conditioned regions 142, 144 that are oppositely polarized, with magnetic field lines 646, 648, in opposite circumferential directions. A pair of magnetic field sensors 652, 654 may be positioned proximate to the magnetoelastically active region 140, such that each magnetic field sensor 652, 656 is placed over the portion of a magnetically conditioned region 142, 144 at a location where the magnetic field strength is at a maximum. The magnetic field sensors 652, 654 are oriented such that their sensitive directions are perpendicular to the direction of magnetization in the magnetoelastically active region 140. In FIG. 6, a dot (indicating a direction out of the page) and an X (indicating a direction into the page) indicate the sensitive directions of the magnetic field sensors 652, 654. Magnetic field sensors 652, 654 are oriented with their sensitive directions perpendicular to the surface of the disk 110 (i.e., in the axial direction), and magnetically conditioned regions 142, 144 are polarized parallel to the surface of the disk 110 (i.e., in the circumferential direction) to ensure that the representative signals outputted by the magnetic field sensors 652, 654 vary linearly with respect to variations in the torque applied to the disk 110. Magnetic field sensors 652, 654 are placed in a common mode rejection configuration to reduce the effects of compassing in the torque sensing device.

Figure 7:
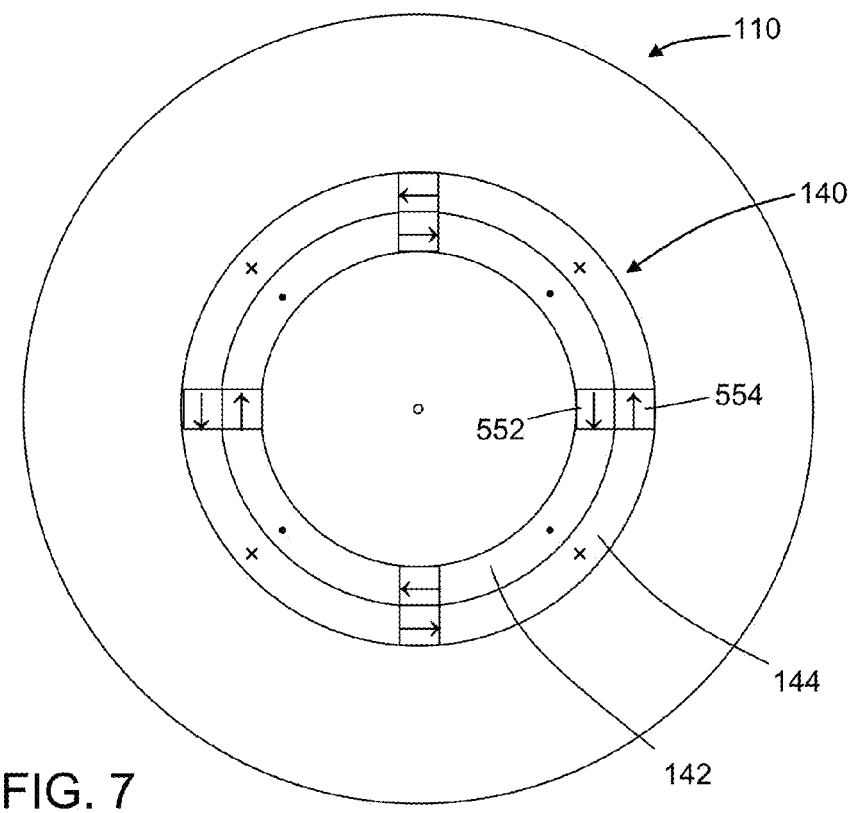
FIG. 7 is a top plan view of a disk-shaped member, showing illustrative positionings of magnetic field sensors, according to another embodiment of the present invention.

Turning to FIG. 7, shown therein is the disk 110 having a magnetoelastically active region 140 with dual magnetically conditioned regions 142, 144, which are polarized in opposite axial directions. Four pairs of magnetic field sensors 552, 554 are positioned proximate to the magnetoelastically active region 140 with their sensitive directions perpendicular to the magnetization of the magnetically conditioned regions 142, 144. The four pairs of magnetic field sensors 552, 554 are evenly spaced about the magnetoelastically active region 140 with approximately 90 degrees between each pair. This configuration provides for improved RSU performance because it allows for representative signals outputted by the multiple magnetic field sensors 552, 554 to be averaged, thereby resulting in a more accurate measurement of the torque applied to the disk 110. Any inaccuracies attributable to a single magnetic field sensor pair due to non-uniformities in the magnetoelastically active region 140 are of reduced significance when the representative signals from multiple magnetic field sensors 552, 554 are averaged. In torque sensing devices having magnetoelastically active regions 140 that exhibit a high degree of uniformity (i.e., RSU signal is substantially zero), as few as one pair of magnetic field sensors 552, 554 may be used to achieve sufficient RSU performance. However, due to limitations in material preparation and magnetization processes, a significant non-zero RSU signal may be difficult to avoid. In instances in which increased RSU performance is desired, the number of magnetic field sensor pairs may be increased. For example, eight pairs of magnetic field sensors 552, 554, spaced at 45 degrees, may be used.

Figure 8:
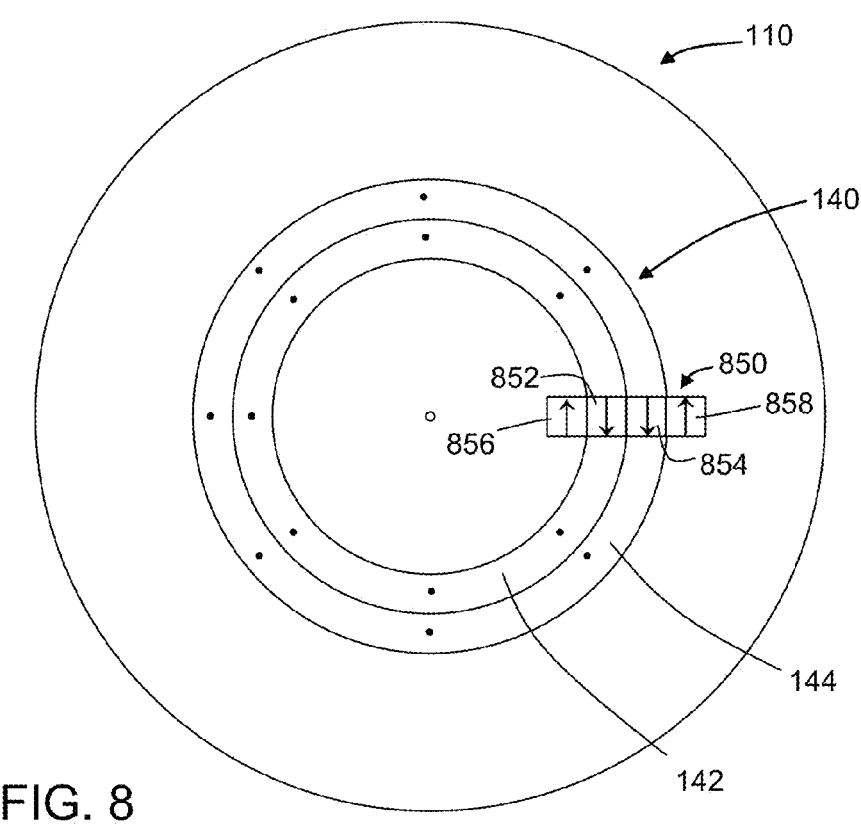
FIG. 8 is a top plan view of a disk-shaped member, showing illustrative positionings of magnetic field sensors, according to another embodiment of the present invention.

Turning to FIG. 8, shown therein is the disk 110 having a magnetoelastically active region 140 with magnetically conditioned regions 142, 144 polarized in a single axial direction to form, essentially, a single magnetically conditioned region. A magnetic field sensor unit 850 includes four individual magnetic field sensors 852, 854, 856, 858. Primary magnetic field sensors 852, 854 are positioned proximate to the magnetoelastically active region 140, are aligned in the radial direction, and are similarly polarized in a direction perpendicular to the magnetization of the magnetoelastically active region 140. Secondary magnetic field sensors 856, 858 are positioned on opposite sides of the primary magnetic field sensors 852, 854, proximate to the disk 110, but apart from the magnetoelastically active region 140, such that the secondary magnetic field sensors 856, 858 do not pick up torque induced signals. The secondary magnetic field sensors 856, 858 are similarly polarized in a direction opposite that of the primary magnetic field sensors 852, 854. This configuration may be advantageous in instances in which a noise source (not shown) creates a local magnetic field gradient having different effects on each of the primary magnetic field sensors 852, 854, as discussed in U.S. Pat. App. Pub. No. 2009/0230953 to Lee, which is incorporated herein by reference. In such an instance, it may be assumed that the noise source has the greatest effect on the secondary magnetic field sensor 856, 858 closest to the noise source, and the least effect on the secondary magnetic field sensor 858, 856 farthest from the noise source. It may also be assumed that the effect of the noise source on the primary magnetic field sensors 852, 854 is between that of its effects on each of the secondary magnetic field sensors 856, 858. Finally, it may be assumed that the sum of the noise induced signals picked up by the secondary magnetic field sensors 856, 858 is equal in value to the sum of the noise induced signals picked up by the primary magnetic field sensors 852, 854. Therefore, by summing the signals picked up by each of the four magnetic field sensors 852, 854, 856, 858, the effect of magnetic noise on the magnetic field sensor unit 850 is canceled, and the composite signal picked up by the magnetic field sensor unit 850 is entirely torque induced.

Figure 9:
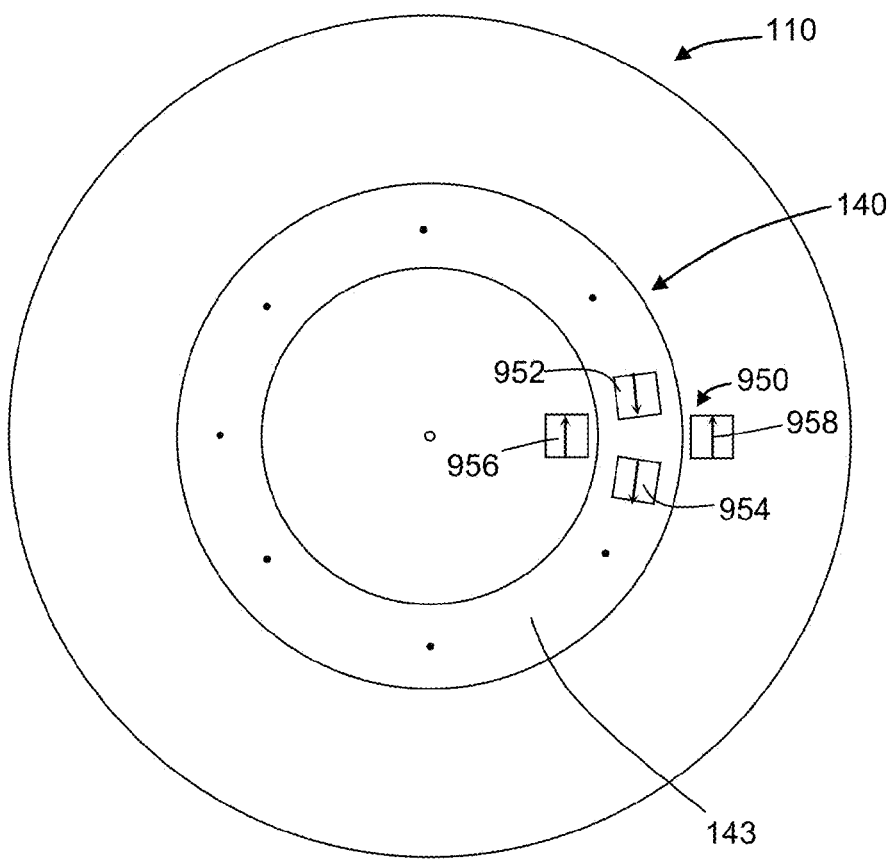
FIG. 9 is a top plan view of a disk-shaped member, showing illustrative positionings of magnetic field sensors, according to another embodiment of the present invention.

FIG. 9 shows a configuration of the disk 110 that may be advantageous in situations in which the radial space on the disk 110 is limited. The disk 110 has a magnetoelastically active region 140 with a single magnetically conditioned region 143 polarized in a single axial direction. A magnetic field sensor unit 950 includes four individual magnetic field sensors 952, 954, 956, 958. Primary magnetic field sensors 952, 954 are positioned proximate to the magnetoelastically active region 140, are aligned in the circumferential direction, and are similarly polarized in a direction perpendicular to the magnetization of the magnetoelastically active region 140. Secondary magnetic field sensors 956, 958 are positioned on opposite sides of the primary magnetic field sensors 952, 954, proximate to the disk 110, but apart from the magnetoelastically active region 140, such that the secondary magnetic field sensors 956, 958 do not pick up torque induced signals. The secondary magnetic field sensors 956, 958 are similarly polarized in a direction opposite that of the primary magnetic field sensors 952, 954. This configuration may be advantageous in instances in which a noise source (not shown) creates a local magnetic field gradient having different effects on each of the primary magnetic field sensors 952, 954, as discussed in U.S. Pat. App. Pub. No. 2009/0230953 to Lee, which is incorporated herein by reference. In such an instance, it may be assumed that the noise source has the greatest effect on the secondary magnetic field sensor 956, 958 closest to the noise source, and the least effect on the secondary magnetic field sensor 958, 956 farthest from the noise source. It may also be assumed that the effect of the noise source on the primary magnetic field sensors 952, 954 is between that of its effects on each of the secondary magnetic field sensors 956, 958. Finally, it may be assumed that the sum of the noise induced signals picked up by the secondary magnetic field sensors 956, 958 is equal in value to the sum of the noise induced signals picked up by the primary magnetic field sensors 952, 954. Therefore, by summing the signals picked up by each of the four magnetic field sensors 952, 954, 956, 958, the effect of magnetic noise on the magnetic field sensor unit 950 is canceled, and the composite signal picked up by the magnetic field sensor unit 950 is entirely torque induced.

Figure 10:
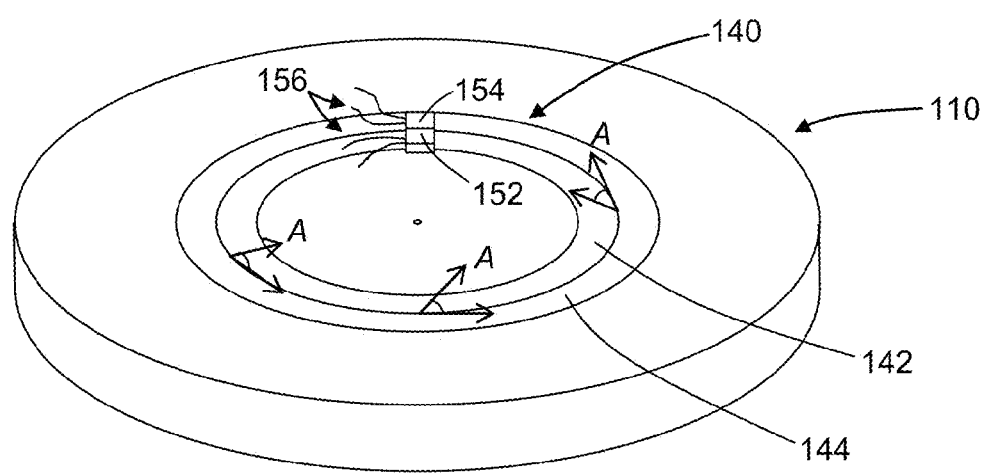
FIG. 10 is a perspective view of a disk-shaped member according to the present invention illustrating a change in the magnetization of the magnetoelastically active region when the disk-shaped member is subjected to torque.

FIG. 10 provides an illustration of the principle by which torque applied to the disk 110 is measured by the torque sensing device. As discussed above, in the quiescent state, the magnetic fields in the magnetoelastically active region 140 are aligned either substantially exclusively in the axial direction, as shown in FIG. 5, or substantially exclusively in the circumferential direction, as shown in FIG. 6. When torque is applied to the disk 110, magnetic moments in the magnetoelastically active region 140 tend to tilt along the shear stress direction, which forms an angle of about 45 degrees with respect to the surface of the disk 110, as indicated by arrows A in FIG. 10. This tilt causes the magnetization of the magnetoelastically active region 140 to exhibit a decreased component in the initial direction, and an increased component in the shear stress direction. The degree of tilt is proportional to the strength of the torque applied to the disk 110. The magnetic field sensors 152, 154 are capable of sensing changes in the strength of magnetic field components along the sensitive directions of the magnetic field sensors 152, 154. Therefore, when torque is applied to the disk 110, magnetic field sensors 152, 154 output representative signals that are proportional to the applied torque.

Magnetic field sensors 152, 154 are known in the art and include magnetic field vector sensor devices such as flux-gate inductors, Hall Effect sensors, and the like. Preferably, the magnetic field sensors according to the present invention are flux-gate inductors having a solenoidal form. In another embodiment, the magnetic field sensors 152, 154 may be integrated circuit Hall Effect sensors. Conductors 156, as shown in FIG. 10, connect the magnetic field sensors to a source of direct current power, and transmit the signal output of the magnetic field sensors 152, 154 to a receiving device (not shown), such as a control or monitoring circuit.

Figure 11:
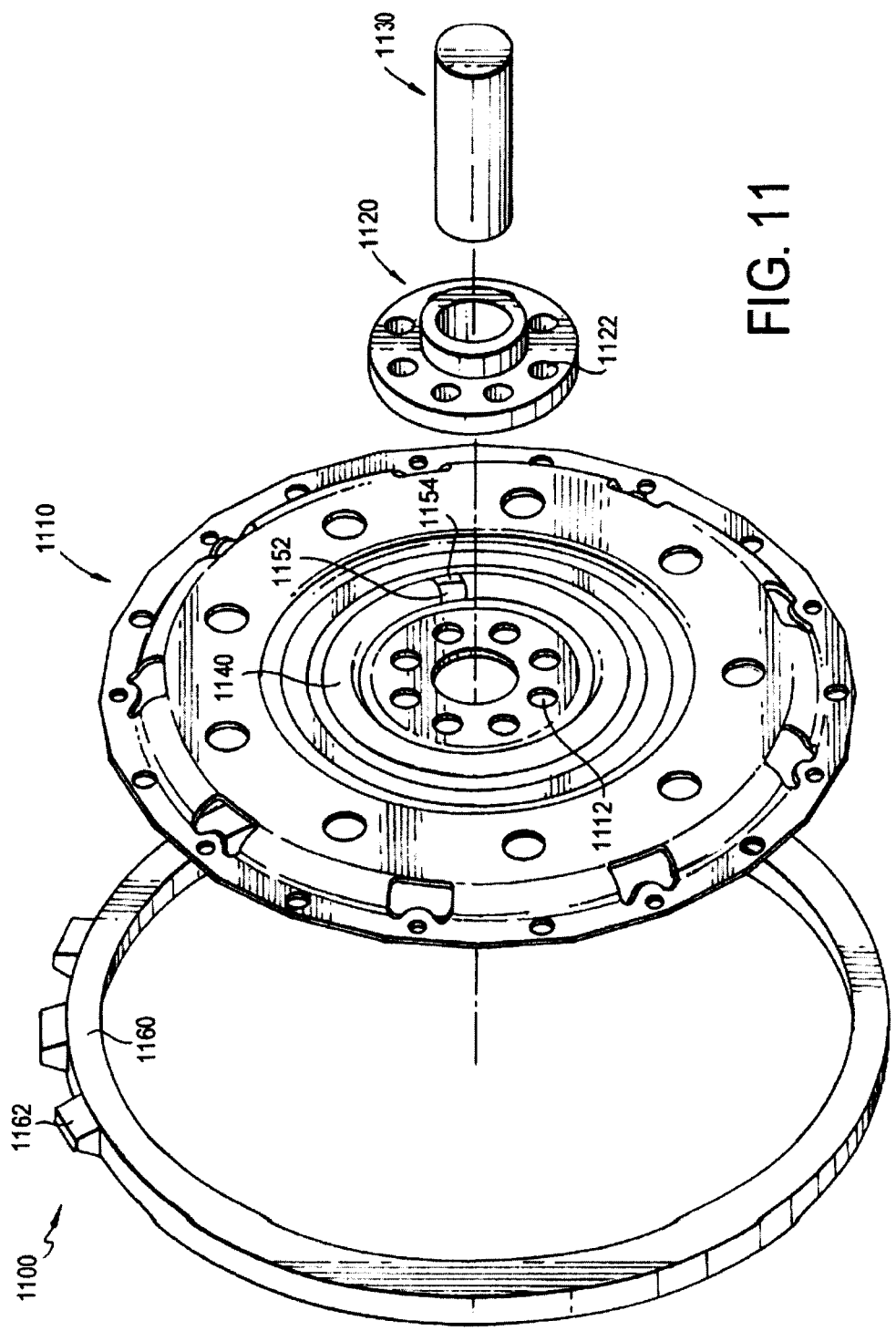
FIG. 11 is an exploded view showing an exemplary torque sensing device according to the present invention for use in an automotive drive train.

Turning to FIG. 11, shown therein is a perspective, exploded view drawing of a torque transducer 1100 in accordance with the present invention. In the exemplary embodiment shown, the torque transducer 1100 includes a disk 1110, a hub 1120, and a shaft 1130. The disk 1110, the hub 1120, and the shaft 1130 may be, but are not necessarily, distinct elements. The disk 1110 may be an axially thin, generally disk-shaped member, which may be completely flat or may include contours. The hub 1120 functions by rigidly attaching the disk 1110 to the shaft 1130. Attachment may be accomplished, for example, directly or indirectly by any known means which permits the hub 1120 and the shaft 1130 to act as a mechanical unit such that torque applied to the shaft 1130 is proportionally transmitted to the hub 1120 and vice versa. Examples of means of attachment include pins, splines, keys, welds, adhesives, press or shrink fits, and the like. The disk 1110 may be attached to the hub 1120 by any appropriate method which permits the disk 1110 and the hub 1120 to act as a mechanical unit such that torque applied to the hub 1120 is proportionally transmitted to the disk 1110, and vice versa. Preferably, holes 1112, 1122 are provided in the disk 1110 and the hub 1120 such that holes 1112 in the disk 1110 correspond to holes 1122 in the hub 1120. Fasteners (not shown), such as bolts, may be inserted through holes 1112 in the disk 1110 and corresponding holes 1122 in the hub 1120 such that a firm attachment is formed between the disk 1110 and the hub 1120. Examples of alternative means of attachment include riveting, welding, and the like.

The disk 1110 may be attached to a rim 1160, such that a portion of the disk 1110 attached to the rim 1160 is radially distinct from a portion of the disk 1110 attached to the hub 1120. The rim 1160 may surround the periphery of the disk 1110, or may be attached to a surface of the disk 1110. The rim 1160 may be an integral part of the disk 1110. The disk 1110 and the rim 1160 act as a mechanical unit such that torque applied to the disk 1110 may be proportionally transmitted to the rim 1160, and vice versa. The rim 1160 may include force transfer features 1162 for the transfer of predominately tangential forces to a driving or driven member.

An exemplary embodiment of the invention is a torque sensing device for use in connection with an automobile engine wherein the disk 1110 includes a drive plate, the shaft 1130 includes a crankshaft, and the rim 1160 includes a torque converter. It will be apparent to those skilled in the art to which the invention pertains, however, that the invention is not limited to any specific type of automobile configuration, nor is the invention limited to automotive applications in general.

The rim 1160 and the hub 1120 are preferably formed of non-ferromagnetic materials or are magnetically isolated from the disk 1110 by non-ferromagnetic spacers, such as low permeability rings (not shown) inserted between the hub 1120 and the disk 1110, and between the disk 1110 and the rim 1160.

The magnetoelastically active region 1140 must possess sufficient anisotropy to return the magnetization to the quiescent, or initial direction when the applied torque is reduced to zero. Magnetic anisotropy may be induced by physical working of the material of the disk 1110 or by other methods. Illustrative methods for inducing magnetic anisotropy are disclosed in U.S. Pat. No. 5,520,059, incorporated herein by reference.

Preferably, the disk 1110 is formed from AISI 9310 material. Examples of alternative materials from which the disk may be formed are described in U.S. Pat. Nos. 5,520,059 and 6,513,395, incorporated herein by reference. The disk 1110 may be formed of a material having a particularly desirable crystalline structure.

In another embodiment of the present invention, the magnetoelastically active region 1140 may be formed separately from the disk 1110, and then applied to the disk 1110 by means such as adhesives, welds, fasteners, or the like, such that torque induced in the disk 1110 is transmitted to and proportional to torque induced in the magnetoelastically active region 1140.

In the operation of the present invention, magnetic fields arise from the magnetoelastically active region 1140 and these fields pervade not only the space in which the magnetic field sensors 1152, 1154 are located but also the space occupied by the disk 1110 itself. Magnetization changes that take place within non-active portions of the disk 1110 may result in the formation of parasitic magnetic fields that may pervade the regions of space where the magnetic field sensors 1152, 1154 are located. The hub 1120 and the rim 1160 can be formed of non-ferromagnetic materials to reduce or eliminate parasitic magnetic fields. Thus, in the interest of not corrupting the transfer function of the magnetoelastically active region 1140, it is important that the parasitic fields be very small, ideally zero, in comparison with the magnetic field arising from the magnetoelastically active region or, if of significant intensity, that they change linearly and anhysteretically (or not at all) with applied torque, and that they be stable with time and under any of the operational and environmental conditions that the shaft 1130, the disk 1110, and the magnetoelastically active region 1140 might be subjected to. Stated otherwise, any parasitic fields which arise must be sufficiently small compared to the magnetoelastically active region field such that the net field seen by the magnetic field sensors 1152, 1154 is useful for torque sensing purposes. Thus, in order to minimize the corrupting influence of parasitic fields, it is important to utilize a disk material having a coercivity sufficiently high that the field arising from the magnetoelastically active region 1140 does not magnetize regions of the disk 1110 proximate to the magnetoelastically active region 1140 to give rise to such parasitic magnetic fields which are of sufficient strength to destroy the usefulness, for torque sensing purposes, of the net magnetic field seen by the magnetic field sensors 1152, 1154. This may be accomplished, for example, by using a material in which the coercivity of the disk 1110 is greater than 15 Oe, preferably greater than 20 Oe, and most desirably greater than 35 Oe.

In addition to torque, the present invention is capable of measuring power, energy, or rotational speed, wherein Power=Torque×2π×Rotational Speed, and Energy=Power/Time.

Although certain presently preferred embodiments of the disclosed invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

I claim:

1. A method of manufacturing a magnetic torque sensing device comprising the steps of:
providing a generally disk-shaped member having opposite generally circular spaced apart surfaces and a central axis of rotation, wherein the disk-shaped member includes at least a portion that is both ferromagnetic and magnetorestrictive, wherein said portion is capable of producing a magnetic field that varies with a torque applied to the disk-shaped member, and wherein said portion possesses sufficient magnetic anisotropy to return the magnetization in said portion to an initial state when the torque applied to the disk-shaped member is reduced to zero;
positioning a pair of oppositely polarized permanent magnets with no radial gap therebetween proximate to the surface of the disk-shaped member at a first distance from a surface of the disk-shaped member; and
rotating the disk-shaped member about its central axis to form two annular, oppositely polarized, magnetically conditioned regions with no radial gap therebetween.

2. The method, as claimed in claim 1, wherein the permanent magnets forming the pair are arranged such that they are polarized in opposite axial directions relative to the disk-shaped member.

3. The method, as claimed in claim 1, wherein the permanent magnets forming the pair are arranged such that they are polarized in opposite circumferential directions relative to the disk-shaped member.

4. The method as claimed in claim 1, wherein the permanent magnets forming the pair are rectangular N42 or N45 grade neodymium iron boron magnets.

5. The method, as claimed in claim 1, wherein the first distance is between about 0.1 mm and 5 mm.

6. The method, as claimed in claim 1, wherein the first distance is about 3 mm.

\* \* \* \* \*